United States Patent
Bean et al.

(10) Patent No.: US 9,685,774 B1
(45) Date of Patent: Jun. 20, 2017

(54) STORAGE TANK WITH BYPASS CONDUCTOR CABLE

(71) Applicant: ALLTEC LLC, Canton, NC (US)

(72) Inventors: Christopher A. Bean, Canton, NC (US); James Stuart Grasty, Jr., Canton, NC (US)

(73) Assignee: Alltec LLC, Canton, NC (US)

( * ) Notice: Subject to any disclaimer, the term of this patent is extended or adjusted under 35 U.S.C. 154(b) by 338 days.

(21) Appl. No.: 14/157,289

(22) Filed: Jan. 16, 2014

(51) Int. Cl.
*H02G 13/00* (2006.01)

(52) U.S. Cl.
CPC .................................. *H02G 13/80* (2013.01)

(58) Field of Classification Search
CPC .......... H02G 13/00; H02G 13/08; H02G 9/00; H02G 9/10; H02G 7/05; H02G 15/34; H02G 15/22; H02G 15/20; H02G 15/02; H02G 15/06; H02G 15/24; H02G 7/12; H02G 7/20; H02G 15/117; H02G 7/06; H02G 7/08; H02G 3/26; H02G 3/081; H02G 3/10; H02G 3/12; B64D 45/02; H01B 11/18; H01B 9/04; H01B 11/002; H01B 7/0807; H01B 7/00; H01B 12/00; H02B 13/00; H02B 5/01; H01R 4/64; H01R 4/68; H01R 4/643; H01R 9/0512; H01R 13/648; H01R 4/66; E04H 12/24
USPC .......................................... 174/2, 70 R, 126.1
See application file for complete search history.

(56) References Cited

U.S. PATENT DOCUMENTS

| | | | | |
|---|---|---|---|---|
| 1,189,565 A | * | 7/1916 | Hartsaw | F03D 11/00 174/2 |
| 1,342,111 A | * | 6/1920 | Howe | H02G 13/00 174/174 |
| 1,633,098 A | * | 6/1927 | Heese | H02G 13/00 174/2 |
| 3,453,493 A | * | 7/1969 | Godwin, Jr. | H05F 3/02 174/6 |
| 6,422,413 B1 | * | 7/2002 | Hall | B65D 90/028 220/4.12 |
| 6,576,844 B1 | * | 6/2003 | Kamata | H01B 5/105 174/108 |
| 7,078,621 B1 | | 7/2006 | Carpenter, Jr. et al. | |
| 7,960,647 B2 | * | 6/2011 | Rizk | H02G 13/00 174/2 |
| 8,232,472 B1 | | 7/2012 | Bean et al. | |
| 2006/0000634 A1 | * | 1/2006 | Arakawa | F16G 11/04 174/128.1 |
| 2008/0217044 A1 | * | 9/2008 | Carlson | H01B 7/1885 174/113 R |
| 2013/0176656 A1 | | 7/2013 | Kaisser et al. | |

OTHER PUBLICATIONS

"Recommended Practice for Lightning Protection of Aboveground Storage Tanks for Flammable or Combustible Liquids", Published by American Petroleum Institute, First Edition Oct. 2009, ©American Petroleum Institute, pp. 1-18.

* cited by examiner

*Primary Examiner* — Pete Lee

(74) *Attorney, Agent, or Firm* — Lee & Hayes, PLLC (57) ABSTRACT

A lightning protection system for liquid storage tanks having floating roofs wherein lightning energy is not directed into the shell of the storage tank. The lightning protection system includes at least one low-resistance low-impedance bypass conductor cable configured for lightning related frequencies and for routing lightning energy and for bounding charges away from the shell of the storage tank.

17 Claims, 10 Drawing Sheets

STORAGE TANK WITH BYPASS CONDUCTOR CABLE

BACKGROUND

Flammable liquids such as gasoline, oil, and alcohol can be stored in floating roof storage tanks. Floating roof storage tanks are usually installed for environmental or economical reasons to limit product loss and reduce the emission of volatile organic compounds. Additionally, floating roof storage tanks sometimes are used to store flammable liquids because fumes of such materials can pose extreme risks of fire and/or explosion. Floating roof storage tanks therefore may be used to reduce the exposed surface area and reduce the vapor space of the flammable liquids, thereby reducing the risk of fires and/or explosions.

Lightning and/or other electrical discharges at or near the floating roof storage tanks, however, pose a serious risk of fire and/or explosion if the discharge ignites the fumes of the flammable liquids. This risk is particularly high at or near the rim of the floating roof of floating roof storage tanks, as an air gap typically exists between the floating roof and the shell of the floating roof storage tank. In fact, rim seal fires are the most common type of fire in floating roof storage tanks.

To mitigate the risk of rim seal fires, it is common to equip floating roof storage tanks with shunts around the rim of the floating roof. The shunts are spring loaded wiping contacts that engage the interior of the shell of the tank, thereby creating an electrical connection between the floating roof and the shell. The shell typically is connected to a grounding system, or may be considered inherently grounded because it physically rests on the earth, and therefore the floating roof can be grounded using shunts or other electrical connections between the floating roof and the shell. During a lightning strike, the lightning current passes from the floating roof, across the shunts, to the shell of the tank and into the earth. Thus, the threat of rim seal fires caused by electrical arcing or other electrical discharges between the floating roof and the shell can be reduced if the shunts and shells are maintained in working order. The shunts, however, tend to wear out over time and therefore may fail to reduce the risk of rim seal fires.

As an adjunct to the use of shunts, lengths of cable may be connected to the floating roof and to the shell of the tank. The length of the cable is dependent upon the distance which the floating roof moves up and down. The cables serve a similar function as the shunts in that during a lightning strike the lightning current is conducted from the floating roof, through the cables, and is dissipated through the shell of the tank down to the earth.

Today there are generally three types of floating roof storage tanks. One type of floating roof storage tank typically includes a cylindrical shell surrounding a floating top. The floating roof moves up and down within the interior of the shell but is exposed to the exterior environment directly overhead. There are also floating roof storage tanks commonly referred to as internal floating roof tanks (IFRTs). IFRTs also include a cylindrical shell but the shell includes a fixed top above the floating roof. The fixed top protects the floating roof from weather as well as defines a vapor space between the fixed top and the floating roof for collecting vapors seeping up from the interior sidewall of the shell and the floating roof.

The third type of floating roof storage tank also typically includes a cylindrical shell, but then rather than have a fixed flat roof, there is a dome on top of the shell. The dome is typically made of aluminum and therefore is commonly referred to as an aluminum dome roof tank (ADRT). The periphery of the dome rests on a lip on the sidewall of the cylindrical shell. Because the shell is made of materials other than aluminum, such as carbon steel, the shell and the dome expand at different rates due to temperature changes. An isolator bearing pad can be positioned between the periphery of the dome and the periphery of the shell along the inner lip to account for the variances caused by the differing expansion rates.

When flammable liquid is pumped through pipes from the storage tank, an electrostatic charge is generated that is commonly referred to as a "bound charge" because the static charge is bound to the flammable fluid. Therefore, small diameter, such as ⅛ inch, stainless steel cables may be installed within the interior of the IFRTs and ADRTs. These stainless steel cables facilitate the dissipation of the electrostatic charge by bonding the floating roof to the fixed roof of the IFTs or to the aluminum dome of the ADRTs, thus acting to equalize differences in electrical charge potentials. However, these stainless steel bonding cables are inadequate for conducting lightning energy because the lightning energy most likely will flow down the external surface of the dome and jump the insulated gap between the dome and the shell on the way down to the earth.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a lightning protection system for a liquid storage tank having a floating roof is provided. The lightning protection system includes at least one bypass conductor cable. The bypass conductor cable is configured such that lightning does not dissipate through the shell of the storage tank and the shell of the storage tank is isolated from the bypass conductor cable. In one or more embodiments, the lightning protection system may include multiple bypass conductor cables along with multiple air terminals spaced apart from one another. The air terminals project above the storage tank and are insulated from the storage tank. The air terminals are also electrically bonded to the bypass conductor cables. Lightning striking any one of the air terminals does not energize the shell of the storage tank and, therefore, the lightning is conducted to the ground through at least one of the bypass conductor cables without passing through the shell of the storage tank.

According to another embodiment disclosed herein, an earthing system to protect a liquid storage tank from lightning is provided. The earthing system includes multiple air terminals spaced apart from one another and projecting above the storage tank. The air terminals are insulated from the storage tank. Each air terminal is electrically bonded with a bypass conductor cable directly to earth ground such that lightning striking any one of the plurality of air terminals does not energize the shell of the storage tank and is conducted to the ground without passing through the shell of the storage tank. In one or more embodiments, each of the bypass conductor cables is covered by an insulating material.

According to yet another embodiment disclosed herein, a bonding system to protect an internal floating roof tank (IFRT) from lightning is provided. An IFRT includes a shell, a fixed top covering the shell, and an internal floating roof floating atop of liquid in the shell. The bonding system includes a bypass conductor cable coupled between the fixed top and the floating roof. The bypass conductor cable electrically bonds the floating roof to the fixed top to neutralize a potential charge between the fixed top and the floating roof.

According to still yet another embodiment disclosed herein, a bonding system to protect an aluminum domed roof tank (ADRT) from lightning is provided. An ADRT includes a shell, a dome covering the shell, and an internal floating roof floating atop of liquid in the shell. The bonding system includes a bypass conductor cable coupled between the dome and the floating roof. The bypass conductor cable electrically bonds the floating roof to the dome to neutralize a potential charge between the dome and the floating roof.

According to even yet another embodiment disclosed herein, a bypass conductor cable for use with liquid storage tanks is provided. The bypass conductor cable includes a cable body having multiple conductors. The conductors are woven together to form a first braided structure. The bypass conductor cable also includes a sheath having multiple wires. The wires are woven together to form a second braided structure. The sheath surrounds the cable body. The bypass conductor cable is connected to other than the shell of the storage tank.

According to another embodiment disclosed herein, a flat and flexible bypass conductor cable for use with liquid storage tanks is provided. The bypass conductor cable includes a copper cable were about 30 conductors define a carrier and about 48 of the carriers are woven together to form a first braided structure. The bypass conductor cable also includes a stainless steel sheath where about 30 wires define a carrier and about 48 of the carriers are woven together to form a second braided structure. Each of the conductors and each of the wires having a diameter of about 0.15 mm and the sheath surrounds the copper cable.

According to yet another embodiment disclosed herein, in a storage tank with a shell and a floating roof floating atop of liquid, a grounding system is provided having a bypass conductor cable inside the storage tank for lightning related frequencies and connected to other than the shell of the storage tank. The bypass conductor cable is configured such that lightning does not dissipate through the shell of the storage tank. The shell of the storage tank is isolated from the bypass conductor cable. The grounding system also includes a reel inside the storage tank and connected to other than the shell of the storage tank. An excess portion of a length of the bypass conductor is wound up by the reel thereby shortening the length of the bypass conductor within the storage tank. In one configuration, the grounding system is for an IFRT and the bypass conductor cable is coupled with the reel between the floating roof and the fixed top of the IFRT. In another configuration, the grounding system is for an ADRT and the bypass conductor cable is coupled with the reel between the floating roof and the dome of the ADRT. The grounding system could include a plurality of reels wherein one of the reels is connected to the floating roof and another one of the reels is connected to either one of the fixed top or the dome of the storage tank. Each of the reels take up excess portions of the length of the bypass conductor cable.

According to another embodiment disclosed herein, a bonding system to protect an ADRT from lightning is provided where the ADRT has a shell, a dome covering the shell, and an internal floating roof floating atop of liquid in the shell. The bonding system includes a bypass conductor cable on the exterior of the ADRT for lightning related frequencies and coupled between the dome and the shell to neutralize a potential charge between the dome and the shell. In one configuration, the bonding system includes another bypass conductor cable inside the ADRT coupled between the dome and the floating roof where the other bypass conductor cable electrically bonds the floating roof to the dome to neutralize a potential charge between the dome and the floating roof.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to lightning protection for liquid storage tanks with floating roofs where one or more bypass conductor cables route lightning energy away from the shell of the storage tank. The technologies disclosed herein are susceptible of embodiment in many different forms. There is no intent to limit the principles of the technologies disclosed herein to the particular disclosed embodiments. In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

Aspects of this disclosure may be used in conjunction with many types of liquid storage tanks with a fixed or floating roof and available in many sizes and shapes such as vertical and horizontal cylindrical, open top and closed fixed top, flat bottom, cone bottom slope and dish bottom. Aspects of this disclosure may also be used in different types of storage tanks. While the immediate benefit is towards storage tanks with floating roofs, the disclosure features may also be suitable and beneficial with storage tanks with a fixed roof. For the sake of simplicity in explaining aspects of the present disclosure, this specification will proceed utilizing floating roof storage tanks 10, 20, 30, shown in FIGS. 1-3, respectively, as the primary examples as described in greater detail below. However, as will be seen, many of aspects of the present disclosure are not limited to the floating roof storage tanks 10, 20, 30. Each of the floating roof storage tanks 10, 20, 30 may generally be referred to simply as a "storage tank" with one or more applicable reference numbers 10, 20, 30.

Figure 1:
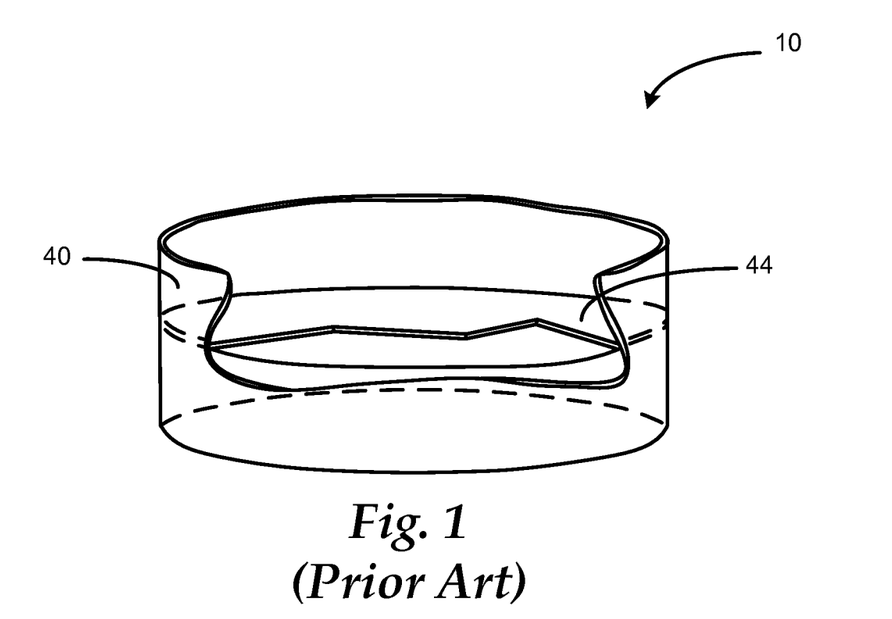
FIG. 1 illustrates a perspective view of one configuration of a floating roof storage tank wherein a portion of the shell is cut away to show a floating roof that floats atop a liquid within the storage tank and wherein the floating roof is exposed to the exterior environment surrounding the storage tank, which is used in association with at least one embodiment disclosed herein.
Figure 2:
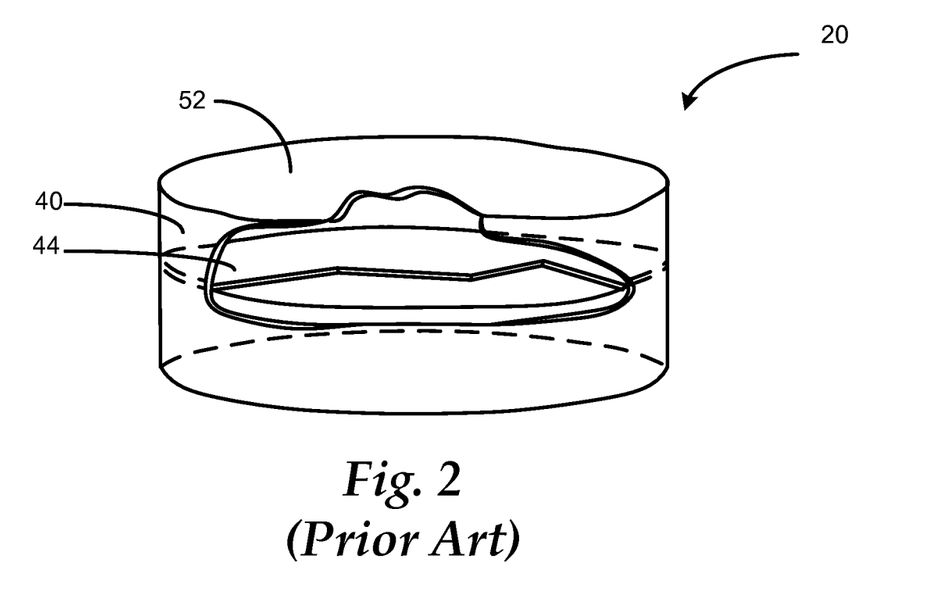
FIG. 2 illustrates a perspective view of one configuration of an internal floating roof storage tank (IFRT) having a top fixed to the cylindrical shell of the tank wherein a portion of the shell is cut away to show an internal floating roof that floats atop liquid within the shell, which is used in association with at least one embodiment disclosed herein.
Figure 3:
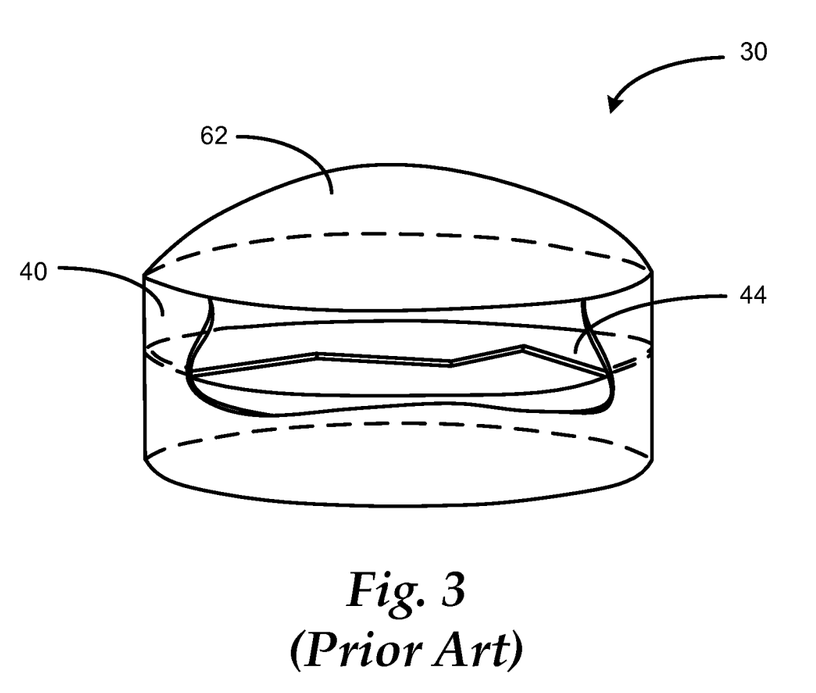
FIG. 3 illustrates a perspective view of one configuration of an aluminum domed roof tank (ADRT) having a dome sitting atop the cylindrical shell of the tank wherein a portion of the shell is cut away to show an internal floating roof that floats atop liquid within the shell, which is used in association with at least one embodiment disclosed herein.

As well understood by those skilled in the art, the exemplary storage tanks 10, 20, 30 depicted in FIGS. 1-3, respectively, each includes a substantially vertical structure such as a shell 40 which surrounds a floating roof 44. The shell 40 may be any shape but typically is cylindrical. The shell may also sometimes be referred to as a sidewall having an inner surface and an opposite exterior surface. The floating roof 44 floats atop liquid 48 (FIGS. 5-9) stored within the storage tank 10, 20, 30 and the floating roof 44 rises and falls with the liquid level inside the storage tank 10, 20, 30. The floating roof 44 has support legs (not shown) that hang down into the liquid 48. The storage tank 10, 20, 30 appears to sit upon the ground itself but typically is placed upon concrete or gravel that isolates the storage tank 10, 20, 30 from the ground.

FIG. 1 illustrates a perspective view of one configuration of the storage tank 10 having an open-topped shell 40 where the floating roof 44 is exposed to the exterior environment surrounding the storage tank 10. FIG. 2 illustrates a perspective view of one configuration of the storage tank 20, commonly referred to as an internal floating roof storage tank (IFRT), where a top 52 is fixed relative to the shell 40 of the storage tank 20 and the internal floating roof 44 floats atop liquid 48 (FIGS. 5 and 6) within the shell 40. FIG. 3 illustrates a perspective view of one configuration of the storage tank 30, commonly referred to as an aluminum domed roof tank (ADRT), wherein a dome 62 sits atop the cylindrical shell 40 of the storage tank 30 and the internal floating roof 44 floats atop liquid 48 within the shell 40.

Figure 4:
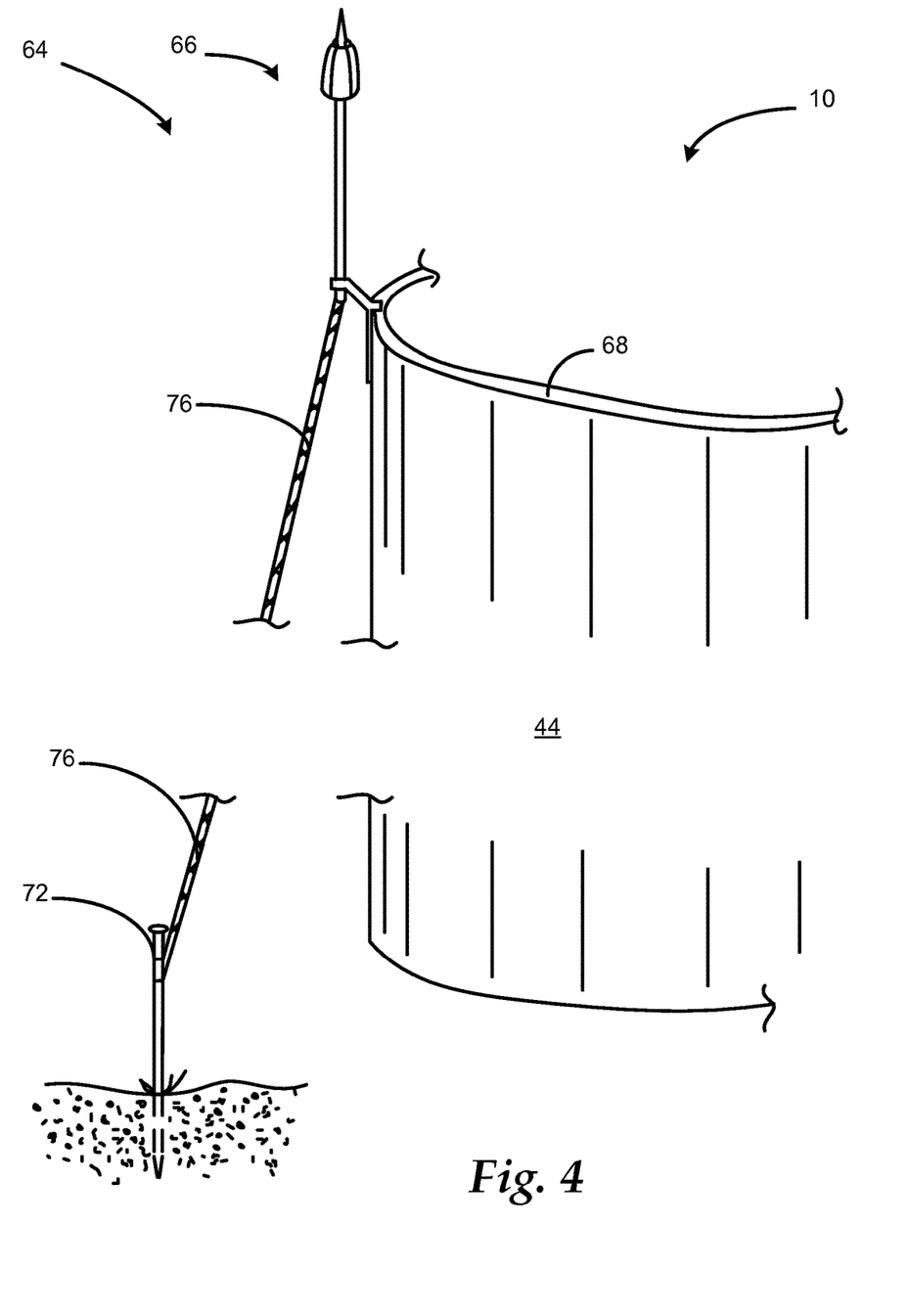
FIG. 4 illustrates a partial perspective view of one configuration of a lightning protections system wherein an air terminal mounted atop a storage tank is electrically bonded to a bypass conductor cable connected to earth ground according to at least one embodiment disclosed herein.

FIG. 4 illustrates a partial perspective view of one configuration of a lightning protection system 64 wherein air terminals 66 are mounted atop storage tank 10. Although FIG. 4 only depicts one air terminal 66, the lightning protection system 64 may include any number of air terminals 66 spaced around the periphery 68 of the shell 40 of the storage tank 10 and projecting up into the air above the shell 40 of the storage tank 10. Lightning protection systems 64 are preferably spaced about every one-hundred feet around the periphery of the storage tank 10. The air terminals 66 may be in any form including hollow, solid, pointed, rounded, flat strips or bristle brush-like metal lightning rods or metallic objects so long as they are conductive and utilize a connection to earth to perform its protective function of earthing.

For example, the air terminals 66 may be early streamer emission terminals as described in U.S. Pat. No. 8,232,472 entitled EARLY STREAMER EMISSION TERMINAL and which is expressly incorporated herein by reference in its entirety. Each of the air terminals 66 are isolated from the shell 40 of the storage tank 10 by a non-conductive support and attachment mechanism such as a bracket for retaining the air terminal in position relative the periphery 68 of the shell 40 and for insulating the shell 40 from the lightning energy striking any one of the air terminals 66. The air terminals 66 are electrically bonded using a wire or electrical conductor to form a direct physical and electrical interface with the ground or "earth ground" by a grounding electrode. FIG. 4 illustrates a grounding electrode in the form of a grounding rod 72. When lightning strikes any one of the air terminals 66 the lightning does not energize the shell 40 of the storage tank 10 and is conducted to the ground through a bypass conductor cables 76 without passing through the shell 40 of the storage tank 10.

Figure 10:
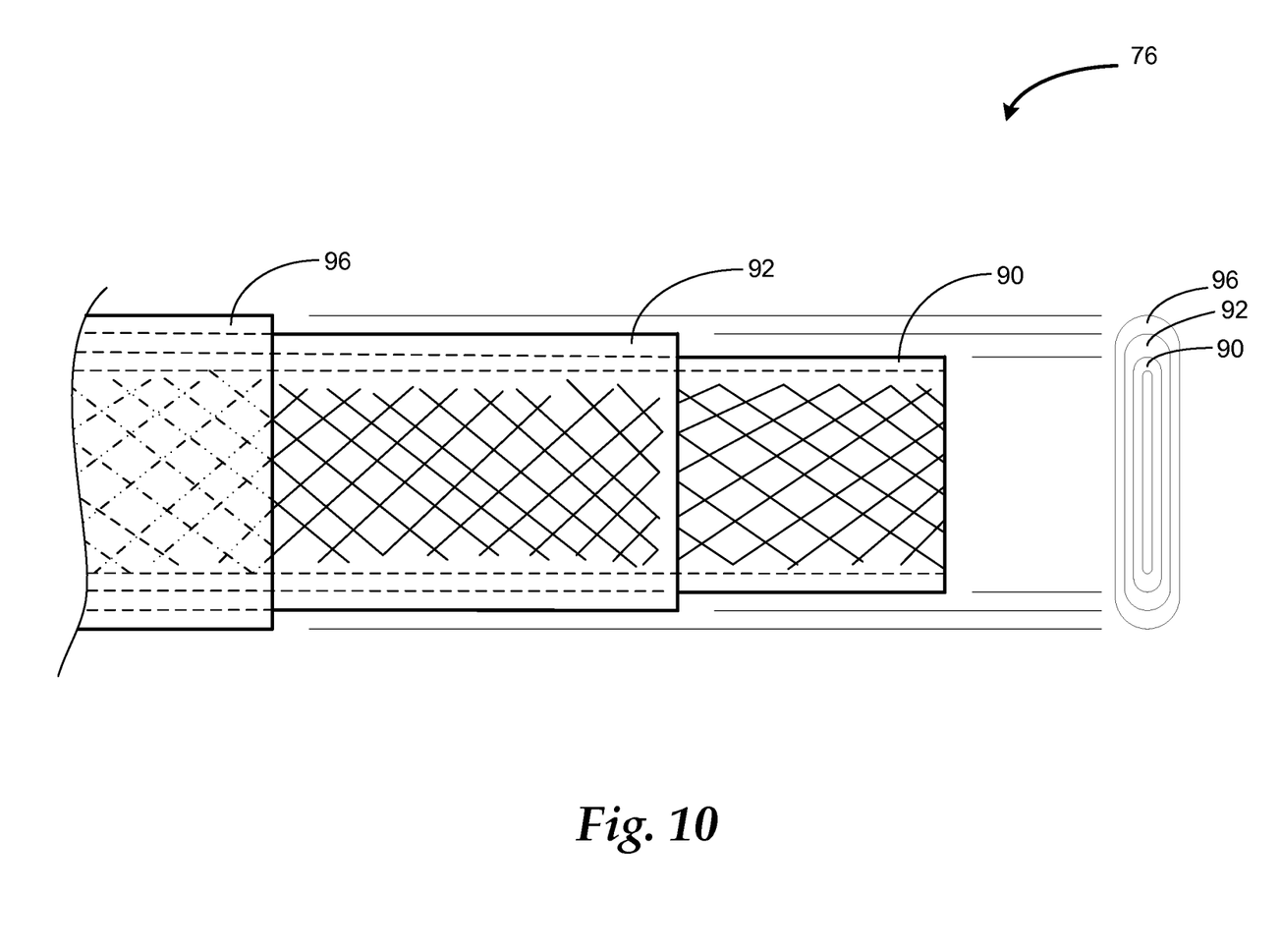
FIG. 10 illustrates one configuration of one end of a bypass conductor cable having an inner cable body with a plurality of conductors woven together to form a first braided structure, a sheath surrounding the inner cable body, and having multiple wires woven together to form a second braided structure wherein an insulating material surrounds the surface of the second braided structure according to at least one embodiment disclosed herein.

The lightning protection system 64 also includes a bypass conductor cable 76 connected to other than the shell 40 of the storage tank 10 for carrying lightning energy from one of the air terminals 66 to one of the grounding rods 72. Each air terminal 66 is electrically bonded to a bypass conductor cable 76 connected to earth ground so that lightning does not dissipate through the shell 40 of the storage tank 10 and so that the shell 40 of the storage tank 10 is isolated from the bypass conductor cables 76. In one or more configurations, the bypass conductor cable 76 may be either insulated or uninsulated. For example, the bypass conductor cable 76 may be covered by an insulating material 96 (FIG. 10). The bypass conductor cable 76 illustrated in FIG. 4 may or may not be insulated.

Figure 5:
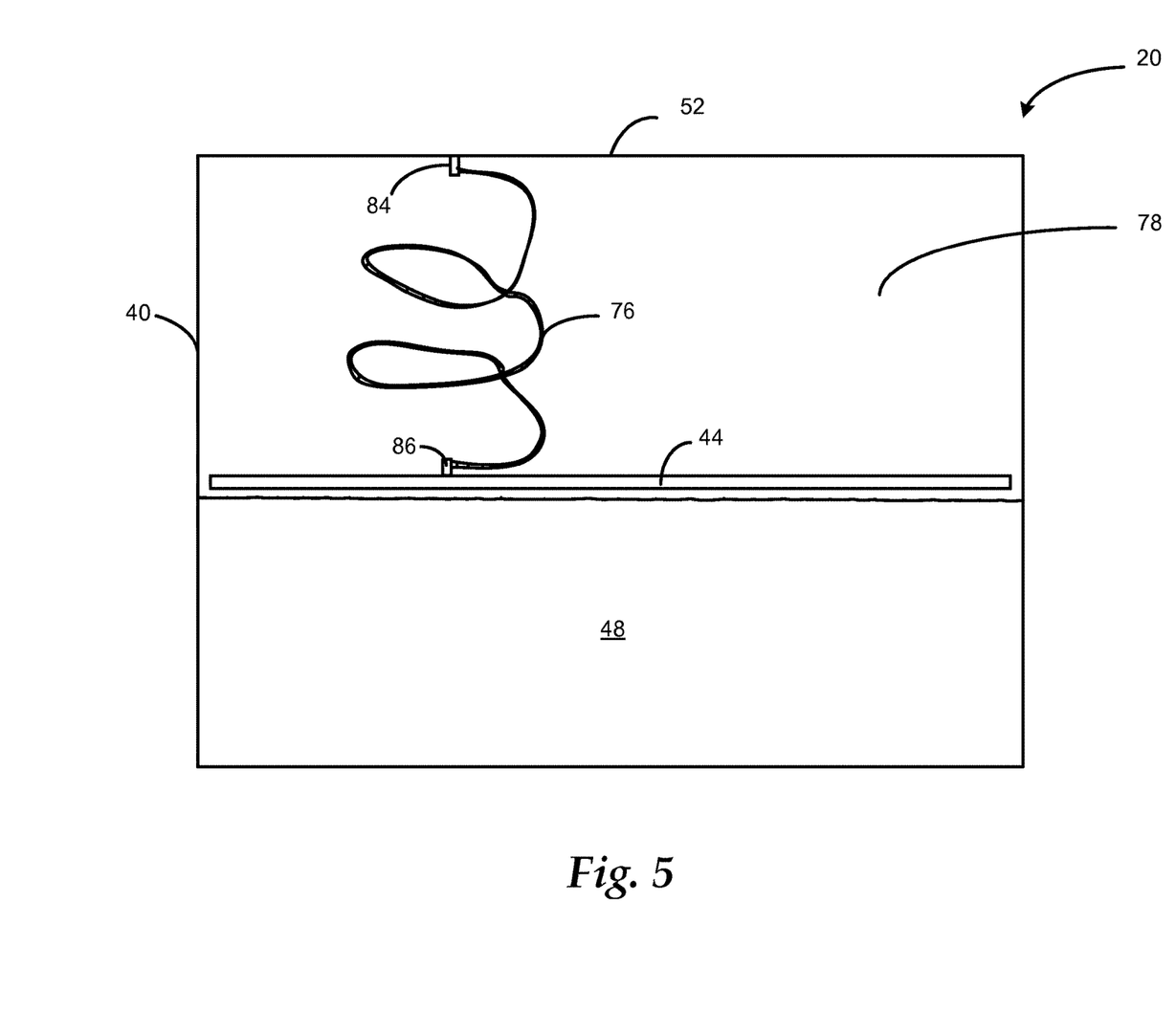
FIG. 5 illustrates one configuration of a bypass conductor cable coupled between the fixed top and the floating roof of an IFRT according to at least one embodiment disclosed herein.

FIG. 5 illustrates another configuration of the bypass conductor cable 76 for use inside the storage tank 20.

Figure 6:
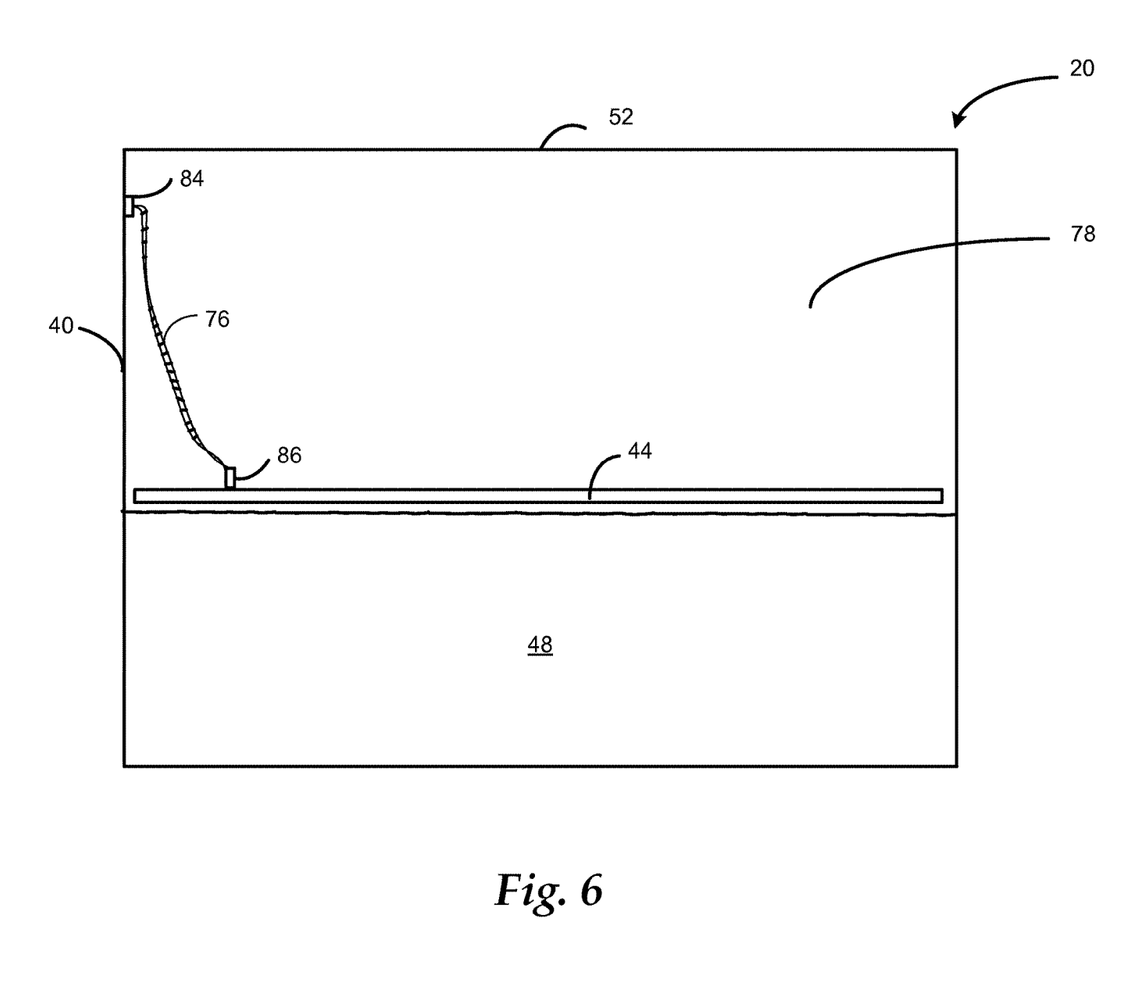
FIG. 6 illustrates one configuration of a bypass conductor cable coupled between the interior sidewall of the shell and the floating roof of an IFRT according to at least one embodiment disclosed herein.

Storage tank 20 is an IFRT and the bypass conductor cable 76 is isolated from the shell 40 in the vapor space 78 and is coupled between the fixed top 52 and the floating roof 44. The bypass conductor cable 76 electrically bonds the floating roof 44 to the fixed top 52 to neutralize any potential charge between the fixed top 52 and the floating roof 44 as a result of lightning or bound charge. Alternatively, the bypass conductor cable 76 may be coupled between the interior sidewall of the shell 40 and the floating roof 44 as shown in FIG. 6.

Because the floating roof 44 moves up and down, the bypass conductor cable 76 is preferably flexible and long enough to allow the floating roof 44 to extend all the way to the bottom of the storage tank 20. One end of the bypass conductor cable 76 is electrically and mechanically coupled to the fixed top 52 with a mechanical fastening mechanism 84 and the other end of the bypass conductor cable 76 is electrically coupled to the fixed floating roof 44 with a mechanical fastening mechanism 86.

The bypass conductor cable 76 within the vapor space 78 of the storage tank 20 may coil itself as the floating roof 44 rises and uncoil itself as the floating roof 44 lowers. In one or more configurations, a reel within the vapor space 78 may be used to accumulate excess length of the bypass conductor cable 76. Excess length of the bypass conductor cable 76 may be wound up by the reel to shorten the bypass conductor cable 76 by keeping any slack out of the bypass conductor cable 76 and to maintain the shortest fractional length between the fixed top 52 and the floating roof 44. The reel inside the storage tank 20 may be fastened and grounded to the bottom of the fixed top 52 or the top of the floating roof 44. Alternatively, the reel may supported from the fixed top 52 between the fixed top 52 and the floating roof 44. For example, the reel may hang from the fixed top 52 by a portion of the bypass conductor cable 76 and the reel may move up and down within the vapor space 78 of storage tank 20 along part of or all of the bypass conductor cable 76. Portions of the bypass conductor cable 76 on either or both sides of the reel may be taken up by the constant pull of the reel. All or one or more portions of the bypass conductor cable 76 illustrated in FIGS. 5 and 6 may or may not be insulated.

Figure 7:
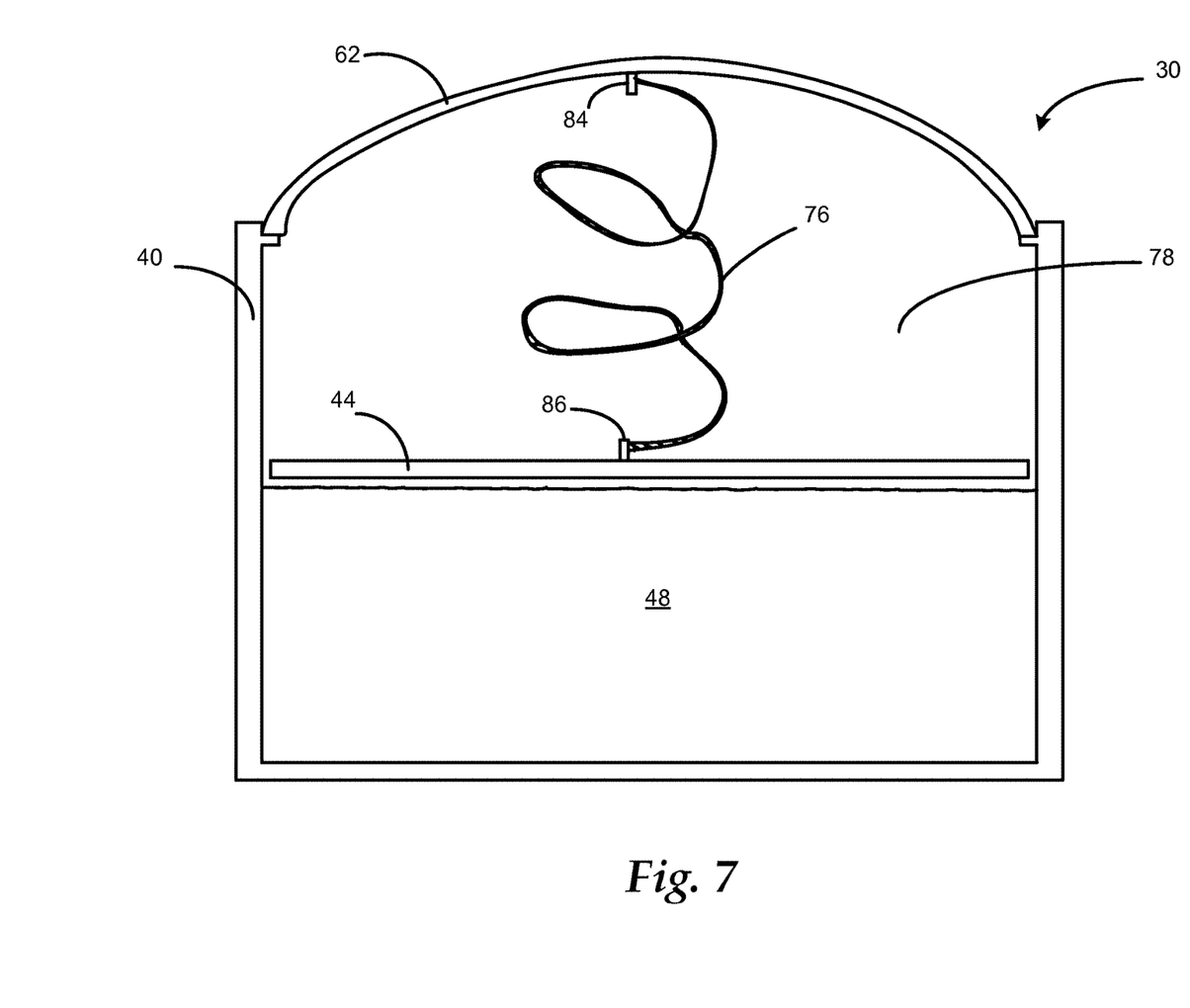
FIG. 7 illustrates one configuration of a bypass conductor cable coupled between the dome and the floating roof of an ADRT according to at least one embodiment disclosed herein.

FIG. 7 illustrates another configuration of the bypass conductor cable 76 for use inside the storage tank 30. Storage tank 30 is an ADRT and the bypass conductor cable 76 is isolated from the shell 40 in the vapor space 78 and is electrically coupled between the dome 62 and the floating roof 44. The bypass conductor cable 76 electrically bonds the floating roof 44 to the dome 62 to neutralize any potential charge between the dome 62 and the floating roof 44 as a result of lightning or bound charge. All or one or more portions of the bypass conductor cable 76 illustrated in FIG. 7 may or may not be insulated.

The floating roof 44 of the storage tank 30 also moves up and down. The bypass conductor cable 76 is preferably long enough and flexible to allow the floating roof 44 to extend all the way to the bottom of the storage tank 30. One end of the bypass conductor cable 76 is electrically and mechanically coupled to the dome 62 with mechanical fastening mechanism 84 and the other end of the bypass conductor cable 76 is electrically coupled to the fixed floating roof 44 with mechanical fastening mechanism 86. The mechanical fastening mechanisms 84, 86 of FIGS. 5-9 are preferably stainless steel providing electrical contact and mechanical retention that meet National Fire Protection Association (NFPA) 780, Standard for Installation of Lightning Protection Systems, primary bond requirements for direct strike lightning protection. In particular, for connections to framework, section 4.19.3 of NFPA 780 requires that conductors be connected to areas of the structural framework, that have been cleaned to base metal, by use of bonding plates having a surface contact area of not less than eight square inches (5200 mm$^2$), typically referred to as a primary bond, or by welding or brazing. Preferably, the mechanical fastening mechanisms 84, 86 each have tabs that are bent over the bypass conductor cable 76 to create a permanent mechanical compression bond between the mechanical fastening mechanism 84, 86 and the bypass conductor cable 76.

Figure 8:
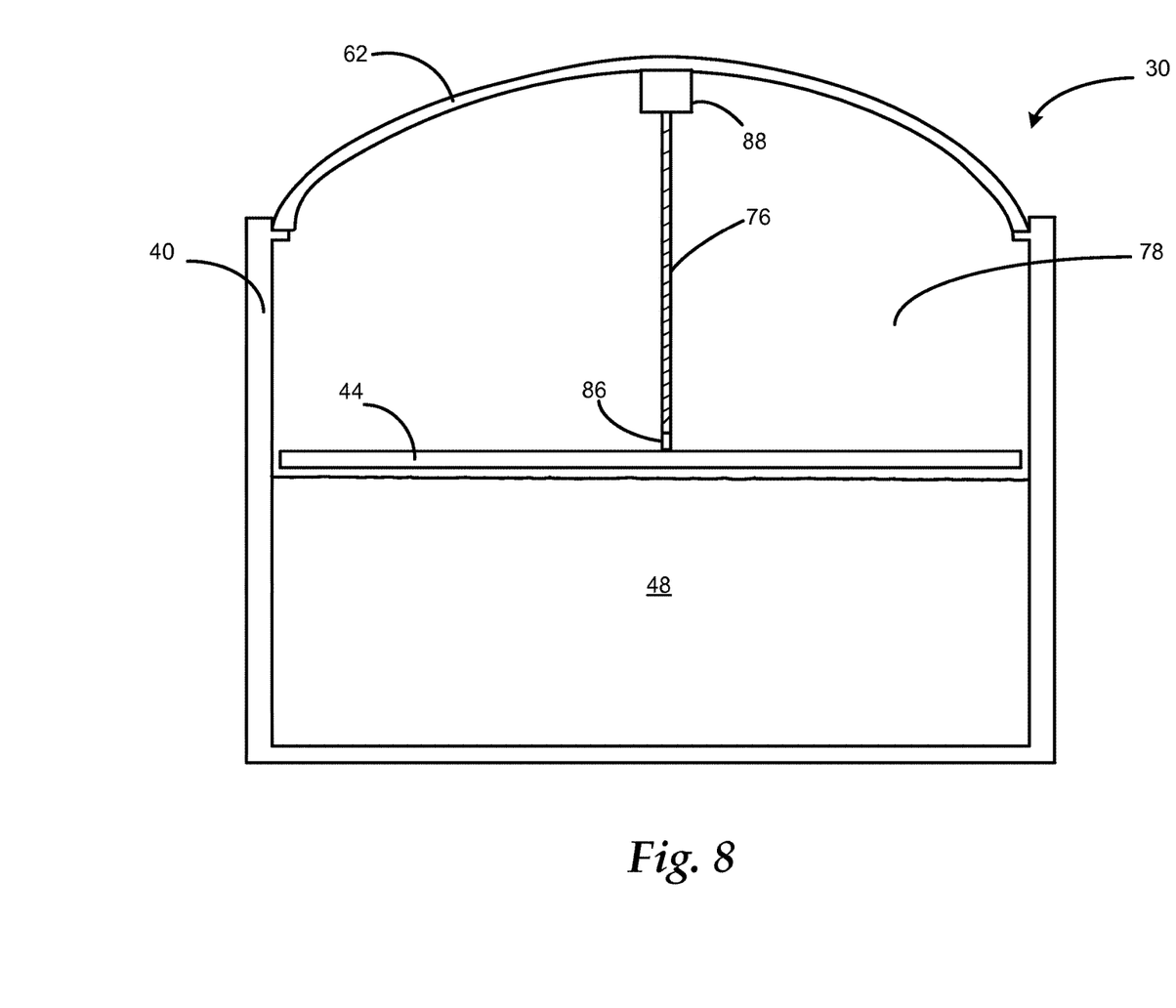
FIG. 8 illustrates one configuration of a reel connected to the dome of an ADRT for taking up the bypass conductor cable coupled between the dome and the floating roof of the ADRT according to at least one embodiment disclosed herein.

A shown in FIG. 8, one or more reels 88 may also be used to accumulate excess length of the bypass conductor cable 76 within the vapor space 78 of the storage tank 30. The reel 88 may be similar to the one described in U.S. Pat. No. 7,078,621, entitled GROUNDING SYSTEM FOR FLOATING ROOFS IN FLAMMABLE STORAGE TANKS, which is incorporated herein by reference in its entirety. Excess length of the bypass conductor cable 76 may be wound up by the reel 88 to shorten the bypass conductor cable 76 by keeping any slack out of the bypass conductor cable 76 and to maintain the shortest fractional length between the dome 62 and the floating roof 44. The reel 88 inside the storage tank 30 may be fastened and grounded to the bottom of the dome 62 or alternatively the top of the floating roof 44. In another embodiment, a reel 88 may be fastened and grounded to the bottom of the dome 62 and another reel 88 may be fastened and grounded to the top of the floating roof 44. Also, the reel 88 may be supported between the dome 62 and the floating roof 44. For example, the reel 88 may hang from the dome 62 by a portion of the bypass conductor cable 76 and the reel 88 may move up and down within the vapor space 78 of storage tank 30 along part of or all of the bypass conductor cable 76 so that portions of the bypass conductor cable 76 on either or both sides of the reel 88 may be taken up by the constant pull of the reel 88. All or one or more portions of the bypass conductor cable 76 illustrated in FIG. 8 may or may not be insulated.

Figure 9:
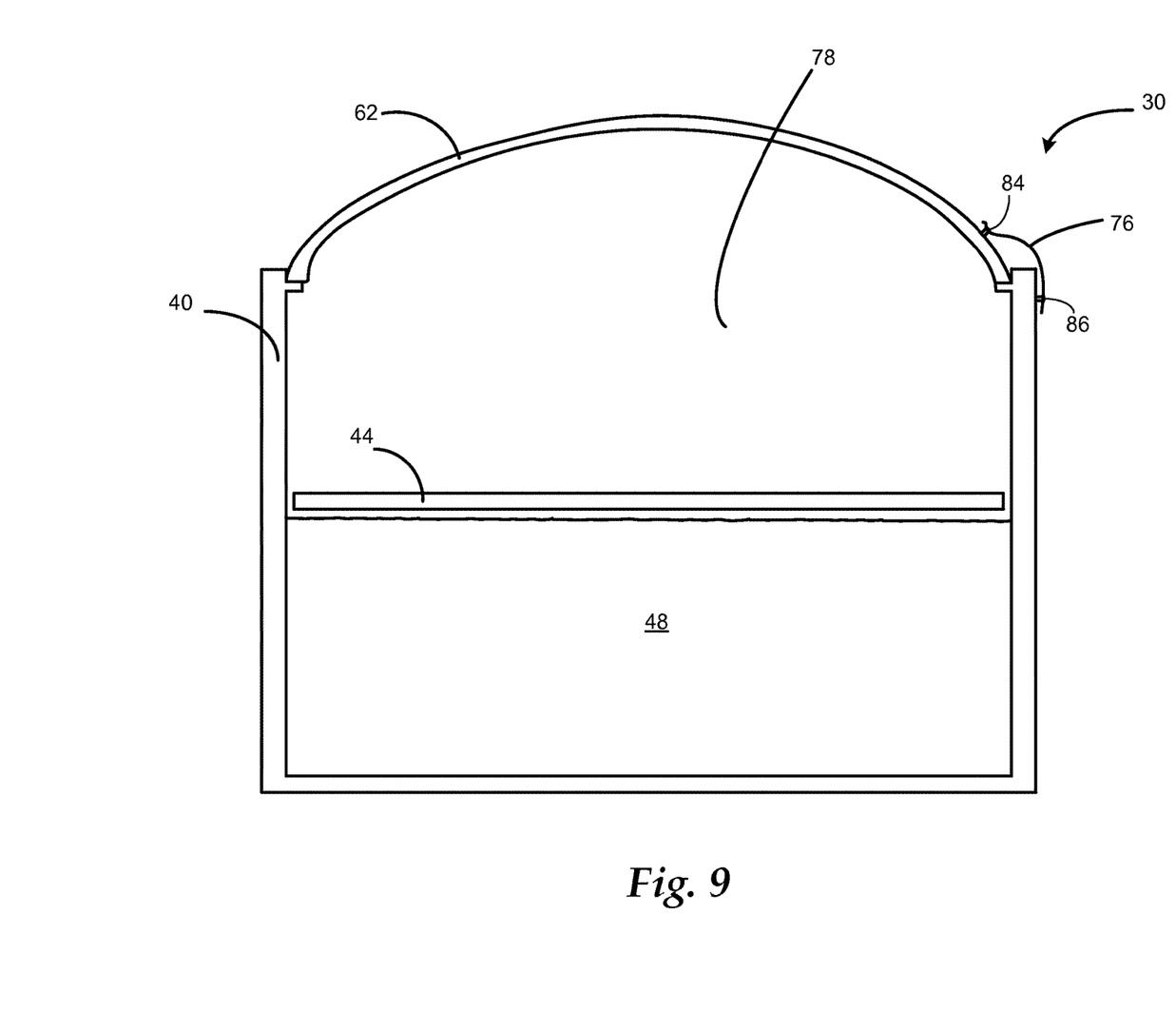
FIG. 9 illustrates one configuration of a bypass conductor cable on the exterior of an ADRT coupled between the dome and the shell of the ADRT as an external bond according to at least one embodiment disclosed herein.

FIG. 9 illustrates one configuration of one or more bypass conductor cables 76 on the exterior of an ADRT coupled between the dome 62 and the shell 40 of the storage tank 30 as an external bond. The bypass conductor cable are preferably spaced about every one-hundred feet around the periphery of the storage tank 30. As mentioned above, small diameter stainless bonding cables may be used inside an ADRT for bound charges, but these stainless steel bonding cables are inadequate for conducting lightning energy. This is because of the surface effect of lightning where the lightning barely penetrates the surface of metal and therefore will not pass through the entire thickness of the dome 62. The lightning flows across only the external surface of the dome 62 and then could jump or arc across the gap between the dome 62 and the shell 40 on the way down to the earth. All or one or more portions of the bypass conductor cable 76 illustrated in FIG. 9 may or may not be insulated. Also, another bypass conductor cable 76 may be utilized inside the storage tank 30 of FIG. 9, coupled between the dome 62 and the floating roof 44 as shown in FIGS. 5-8, to electrically bond the floating roof 44 to the dome 62 and to neutralize a potential charge between the dome 62 and the floating roof 44.

FIG. 10 illustrates one configuration of one end of the bypass conductor cable 76 for safely routing lightning currents. Although FIG. 10 illustrates a particular end of the bypass conductor cable 76, preferably substantially the entire length of the bypass conductor cable 76 is configured as shown in FIG. 10. The bypass conductor cable 76 preferably is flat and woven to be flexible and provides a low resistance-low impedance connection to ground as shown in FIG. 4, between the floating roof 44 and fixed top 52 as shown in FIG. 5, between the floating roof 44 and the interior sidewall of the shell 40 as shown in FIG. 6, between the floating roof 44 and dome 62 as shown in FIGS. 7 and 8, and between the shell 40 and the dome 62 as shown in FIG. 9. The bypass conductor cables 76 preferably meets American Petroleum Institute (API) recommended Practice 545, Sections 4.2.1.2.1 and 4.2.1.2.2. Preferably the bypass conductor cable 76 has a total end-to-end resistance of less than about 0.03 ohms per 30 feet.

The bypass conductor cable 76 includes an inner cable body 90 for conducting lightning energy and bound charges and includes a sheath 92 for providing protection and mechanical strength by surrounding the cable body 90. In one or more configurations, insulating material 96, which may be any flexible non-conductive material such as plastic, for example polyvinyl chloride (PVC), surrounds the bypass conductor cable 76. In one or more configuration, one or more portions of the bypass conductor cable 76 are uninsulated or all or part of the material surrounding the sheath 92 is conductive when collected and coiled within the reel 88.

The cable body 90 is preferably high-grade corrosion resistant tinned copper or some other suitable material for conducting lightning energy and bound charges and is formed from multiple conductors woven together to form a first braided structure. Multiple solid conductors of small diameter provide more surface area and therefore offer lower impedance to the lightning current than compared to a single solid wire with the same cross-sectional area. The cable body 90 may include about 25 to about 35 inner copper wires defining a carrier. About 40 to 55 carriers are then woven together to form the first braided structure. Preferably, the cable body 90 includes 30 inner copper wires that define a carrier and about 48 carriers that are woven together to form the first braided structure.

The sheath 92 is preferably stainless steel such as grade 316 stainless steel because of its mechanical strength and corrosion resistance and is formed from multiple wires woven together to form a second braided structure that surrounds the cable body 90. The stainless steel sheath 92 may include about 25 to about 35 wires defining a carrier and about 40 to about 55 carriers are woven together to form the second braided structure. Preferably, the sheath 92 includes about 30 wires that define a carrier and about 48 carriers are woven together to form the second braided structure. Also, the number of the conductors of the cable body 90 and the number of the wires of the sheath 92 are preferably about the same. Each of the conductors of the cable body 90 and each of the wires of the sheath 92 have a diameter of about 0.2 mm to about 0.1 mm. Preferably, the diameter of each of the conductors of the cable body 90 and each of the wires of the sheath 92 is about 0.15 mm.

Figure 11:
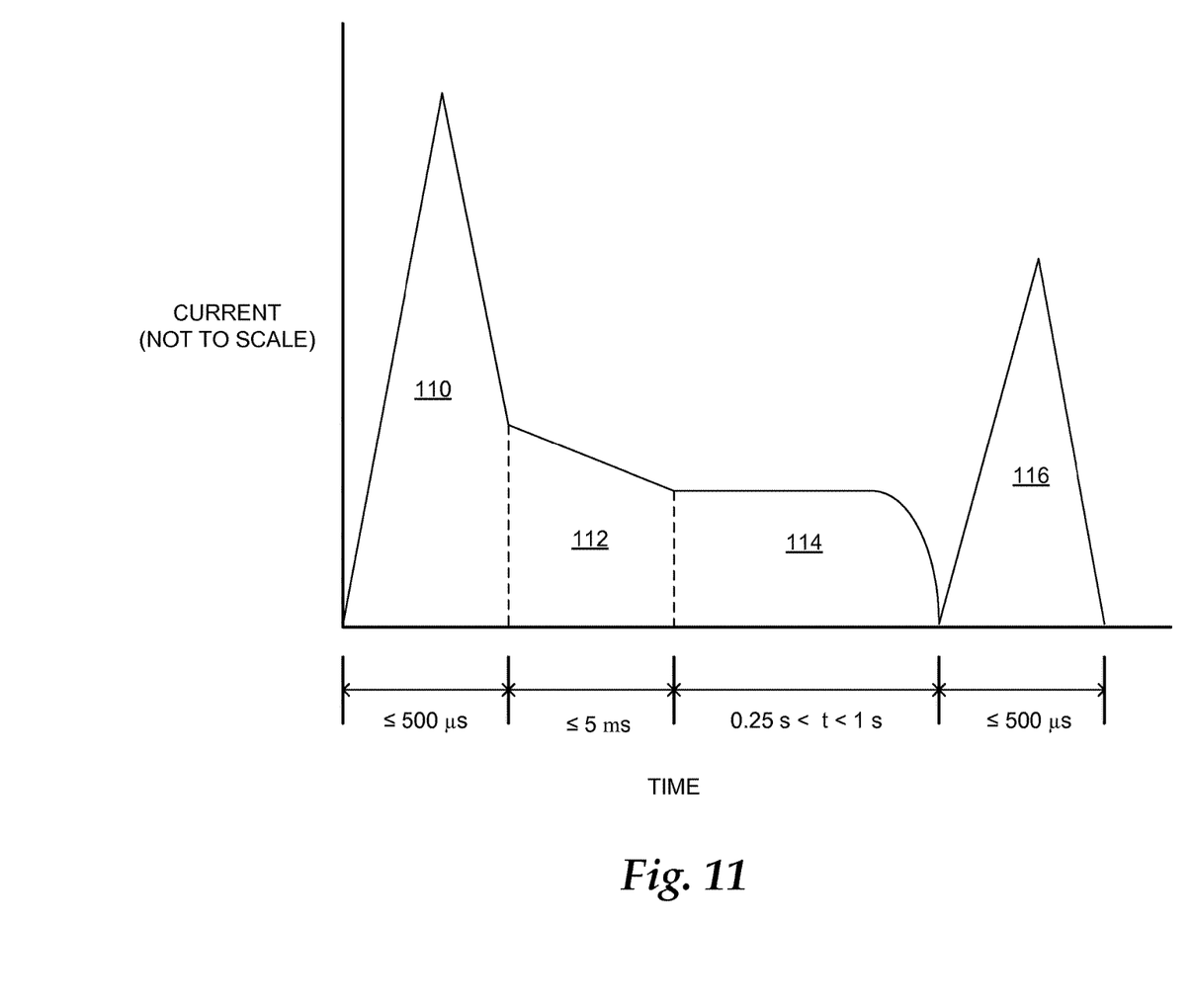
FIG. 11 illustrates one configuration of the components of a typical negative cloud-to-ground lightning stroke.

Each flash of lightning or lightning discharge consists of several components commonly referred to as lightning related frequencies. For example, as explained in America Petroleum Institute recommended Practice 545, First Edition, October 2009, entitled RECOMMENDED PRACTICE FOR LIGHTNING PROTECTION OF ABOVEGROUND STORAGE TANKS FOR FLAMMABLE OR COMBUSTIBLE LIQUIDS, which is expressly incorporated herein by reference in its entirety, and as generally illustrated in FIG. 11, a flash of lightning may have four components such as a first return stroke 110, an intermediate current 112, a continuing current 114, and a subsequent return stroke 116. If the subsequent return stroke 116 is present, it may be followed by additional intermediate and continuing currents 112, 114 until the discharge is completed. These four components of the lightning current waveform may be referred to simply as components 110, 112, 114 and 116. Note that the four components 110, 112, 114, 116 are not drawn to scale and that component 110 may actually be about 100 to 1000 times larger relative to components 112, 114.

Component 110 produces the surface effect described above and is commonly referred to as the high lightning related frequency. For fast pulses of current in lightning strikes, the surface effect requires current to flow as a thin layer on the surface of the conductor, but not through the conductor from one side to the other. Also, the impedance of the conductor depends on inductance at high frequency events. At low frequencies the resistive impedance is much greater than the inductive reactance for all wire sizes. Component 110 has a high rate of rise of current relative to time and therefore requires both a low impedance and low resistance path whereas components 112, 114 only require low resistance. Thus, because of the low impedance requirement due to the high rate of rise of current of component 110, typical bonding cables such as the small diameter stainless steel cable referred to above (higher impedance) cannot effectively handle component 110 of lightning strikes. For a typical lightning current waveform, using a broad surface area, such as the rectilinear cross-sectional shape of the bypass conductor 76, instead of conventional solid or small strand count round wire for bonding straps significantly reduces overall impedance. Therefore, the bypass conductor cable 76 can effectively handle an entire or complete lightning discharge of varying current components characterized by the lightning current waveform of components 110, 112, 114, 116.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A lightning protection system for a liquid storage tank, the storage tank having a shell and a floating roof floating atop of liquid in the shell, the lightning protection system comprising: a plurality of bypass conductor cables having a rectilinear cross-sectional shape connected to a plurality of air terminals projecting above the shell of the storage tank, the plurality of bypass conductor cables comprising about 25 to 35 inner copper wires defining a first carrier and wherein about 40 to 45 of said first carriers are woven together to form a first braided structure, a plurality of woven stainless steel wires forming a sheath surrounding the copper wires, wherein the sheath comprising about 25 to 35 stainless steel wires defining a second carrier and wherein about 40 to 55 of said second carriers are woven together to form a second braided structure surrounding the first braided structure and being configured such that lightning does not dissipate through the shell of the storage tank, and wherein the shell of the storage tank is isolated from the plurality of bypass conductor cables and the plurality of air terminals are spaced apart from each other above the storage tank, the plurality of air terminals are insulated from the storage tank and electrically bonded to the plurality of bypass conductor cables, and wherein lightning striking any one of the plurality of air terminals does not energize the shell of the storage tank and is conducted to ground through at least one of the plurality of bypass conductor cables without passing through the shell of the storage tank.

2. The lightning protection system of claim 1, wherein each of said plurality of bypass conductor cables is connected to earth ground.

3. The lightning protection system of claim 1, wherein each of the plurality of bypass conductor cables is connected to a grounding electrode.

4. The lightning protection system of claim 1, wherein the plurality of bypass conductor cables have a total end-to-end resistance of less than about 0.03 ohms per 30 feet.

5. The lightning protection system of claim 1, wherein the storage tank is isolated from ground.

6. The lightning protection system of claim 1, wherein the plurality of inner copper wires comprises 30 inner copper wires defining the first carrier and wherein 48 of said carriers are woven together to form the first braided structure.

7. The lightning protection system of claim 1, wherein the sheath comprises 30 stainless steel wires defining the second carrier and wherein 48 of said carriers are woven together to form the second braided structure.

8. The lightning protection system of claim 1, wherein a diameter of the plurality of inner copper wires is about 0.2 mm to about 0.1 mm and wherein a diameter of the plurality of stainless steel wires is about 0.2 mm to about 0.1 mm.

9. The lightning protection system of claim 1, wherein a diameter of the plurality of inner copper wires is 0.15 mm and wherein a diameter of the plurality of stainless steel wires is 0.15 mm.

10. The lightning protection system of claim 1, wherein the plurality of bypass conductor cables further comprise an insulating material surrounding the sheath.

11. An earthing system to protect a liquid storage tank from lightning, the storage tank having a shell and a floating roof floating atop of liquid in the shell, the earthing system comprising: a plurality of air terminals spaced apart from one another and projecting above the storage tank, the plurality of air terminals insulated from the storage tank, and each air terminal of the plurality of air terminals are electrically bonded with a bypass conductor cable directly to earth ground such that lightning striking any one of the plurality of air terminals does not energize the shell of the storage tank and is conducted to ground without passing through the shell of the storage tank, wherein the bypass conductor cable has a rectilinear cross-sectional shape and comprises about 25 to 35 inner copper wires defining a first carrier and wherein about 40 to 45 of said first carriers are woven together to form a first braided structure, and a sheath surrounding the copper wires comprising about 25 to 35 stainless steel wires defining a second carrier and wherein about 40 to 55 of said second carriers are woven together to form a second braided structure surrounding the first braided structure.

12. The earthing system of claim 11, wherein the at least one bypass conductor cable has a total end-to-end resistance of less than about 0.03 ohms per 30 feet.

13. The earthing system of claim 11, wherein the plurality of inner copper wires comprises 30 inner copper wires defining the first carrier and wherein 48 of said carriers are woven together to form the first braided structure.

14. The earthing system of claim 11, wherein the sheath comprises 30 stainless steel wires defining the second carrier and wherein 48 of said carriers are woven together to form the second braided structure.

15. The earthing system of claim 11, wherein a diameter of the plurality of inner copper wires is about 0.2 mm to about 0.1 mm and wherein a diameter of the plurality of stainless steel wires is about 0.2 mm to about 0.1 mm.

16. The earthing system of claim 11, wherein a diameter of the plurality of inner copper wires is 0.15 mm and wherein a diameter of the plurality of stainless steel wires is 0.15 mm.

17. The earthing system of claim 11, wherein the bypass conductor cable further comprises an insulating material surrounding the sheath.

\* \* \* \* \*